United States Patent

Biorseth

[15] 3,666,078
[45] May 30, 1972

[54] METHOD AND APPARATUS FOR INVERTING RIGID OR FLEXIBLE SHEETS

[72] Inventor: Elwin J. Biorseth, Cincinnati, Ohio
[73] Assignee: The Mead Corporation, Dayton, Ohio
[22] Filed: Mar. 5, 1970
[21] Appl. No.: 16,865

[52] U.S. Cl. ............................................. 198/33 AD, 271/76
[51] Int. Cl. ..................................... B65g 47/24, B65h 29/12
[58] Field of Search ...................... 198/33 AD, 20, 129, 184; 271/75–76, 65; 214/1 R, 1 S

[56] References Cited

UNITED STATES PATENTS

| | | | |
|---|---|---|---|
| 3,285,392 | 11/1966 | Wood | 198/128 |
| 1,226,730 | 5/1917 | Weston | 198/136 |

*Primary Examiner*—Edward A. Sroka
*Attorney*—Irvin V. Gleim, Edward M. Tritle and Francis M. Crawford

[57] ABSTRACT

The direction of movement of blanks of rigid or flexible sheet material is reversed and the blanks are inverted by subjecting them to centrifugal force sufficient to overcome gravitational effects and maintain driving engagement between endless flexible belts and the blanks while they are driven by the belts along an arcuate path.

8 Claims, 6 Drawing Figures

Patented May 30, 1972

INVENTOR.
ELWIN J. BIORSETH
BY
Attorneys

Patented May 30, 1972  3,666,078

INVENTOR.
ELWIN J. BIORSETH
BY
Attorneys

INVENTOR.
ELWIN J. BIORSETH

METHOD AND APPARATUS FOR INVERTING RIGID OR FLEXIBLE SHEETS

BACKGROUND

The present invention relates to material handling and, more particularly, to apparatus and method for inverting blanks of sheet material, either rigid or flexible, while the blanks are being fed from one manufacturing operation and prior to a subsequent operation.

Blanks of sheet material frequently require a treatment, such as application of a coating material, to be applied to both sides thereof. Heretofore, this has required duplication of the treatment-applying apparatus as well as additional and complicated apparatus for inverting the blanks or has required manual inversion thereof, all of which involves considerable time, expense, and inefficient use of available manufacturing areas. Accordingly, it is a principal object of the present invention to provide improved means and method for obviating such difficulties and disadvantages and which is inexpensive, mechanically simple, is automatic in operation, and eliminates the need for duplication of treatment-application equipment.

SUMMARY

These and other objects and advantages are achieved in accordance with the present invention which enables both sides of workpieces or blanks of rigid or flexible material to be treated at a single work station. After conveying the workpieces past the work station and applying desired treatment to one side of the workpieces, they are inverted and re-conveyed past the same work station to apply the same treatment to the opposite side of the workpieces. Inversion is accomplished by endless belts frictionally driving the workpieces through an arcuate path and subjecting them to centrifugal force sufficient to overcome gravitational effects and to maintain driving engagement between the belts and the workpieces.

In accordance with the present invention the blanks B are driven by belts 21 along an arcuate path and are thereby subjected to centrifugal force. And if the belt speed is sufficient to produce centrifugal force in amount to overcome the effect of gravity, no additional means is needed to maintain engagement between the belts and the inverted or partially inverted blanks regardless of their physical size or weight. For example, it can be shown that to invert blanks in a semicircular arc 6 feet in diameter in accordance with the invention, the speed of belts 21 theoretically should be at least about 600 feet per minute. However, operating experience has shown that unexpectedly the improved inverter 10 will operate satisfactorily and invert rigid blanks up to five feet in length without requiring additional engagement-maintaining means at materially reduced belt speeds which produce centrifugal force amounting to as little as two-thirds the effect of gravity.

DESCRIPTION

Manufacturing operations often require treatment of both sides of panels or blanks B of either rigid or flexible sheet material such a paperboard, fiberboard, wood, metal, and the like. After treatment of one side, the panels of blanks need to be inverted to receive treatment of the opposite side.

Figure 1:
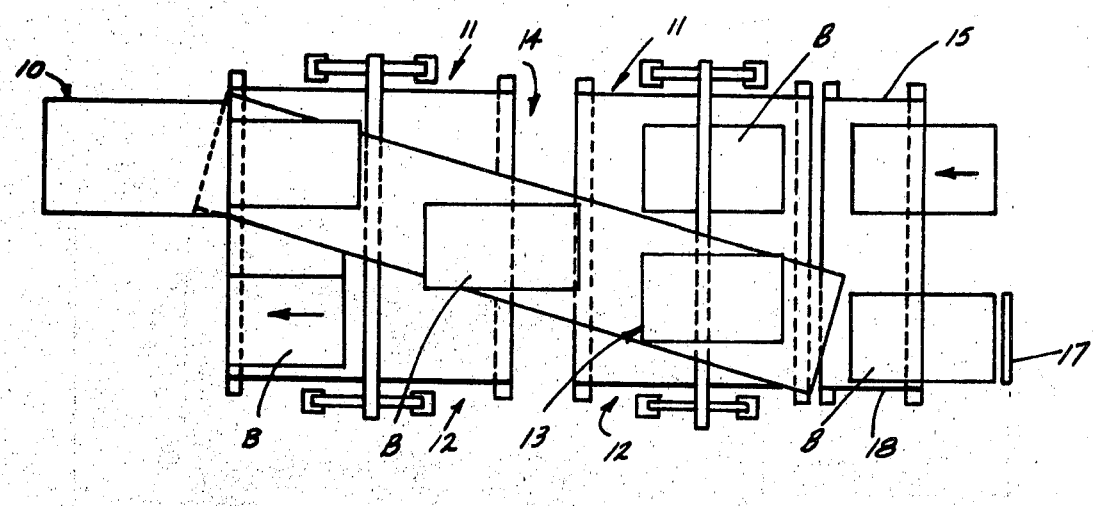
FIG. 1 is a diagrammatic top plan view of conveyor apparatus including improved inverting apparatus embodying the present invention.
Figure 2:
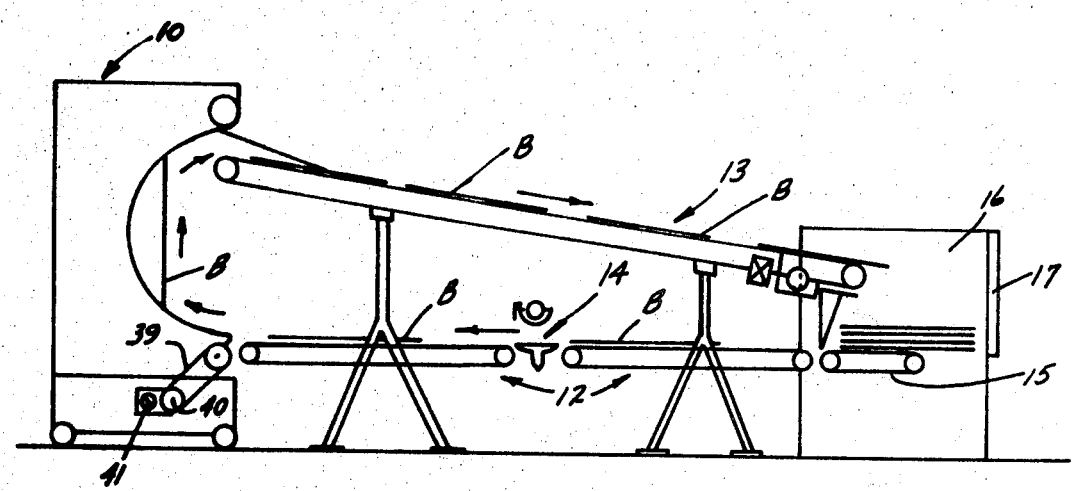
FIG. 2 is a diagrammatic side elevation view of the embodiment of FIG. 1.

To facilitate an understanding of the construction and operation of the present invention and its relationship with other apparatus in connection with which it may be used, there is shown diagrammatically in FIGS. 1 and 2 an improved inverter 10 together with conveyors 11, 12, 13, and arranged in operative relationship for subjecting both sides of panels or blanks B to a manufacturing operation, such as application of a coating material, at a single work station 14.

The blanks are fed by conventional blank separating and feeding means 15 to conveyor 11 which conveys the blanks to and from the work station or coater 14 and delivers the coated blanks to the inverter 10. In addition to inverting the blanks, the inverter reverses the direction of their movement and also elevates the blanks which are then placed on an elevated conveyor 13. As the blanks are discharged from conveyor 13, they are straightened by a side guide 16 and their movement is arrested by a stop 17 so that they fall onto another blank separating and feeding means 18. The then inverted blanks are fed by the separating and feeding means 18 onto conveyor 12 which, in turn, feeds the inverted blanks to and from the coater 14 following which they are removed to storage or to other manufacturing operations.

Figure 3:
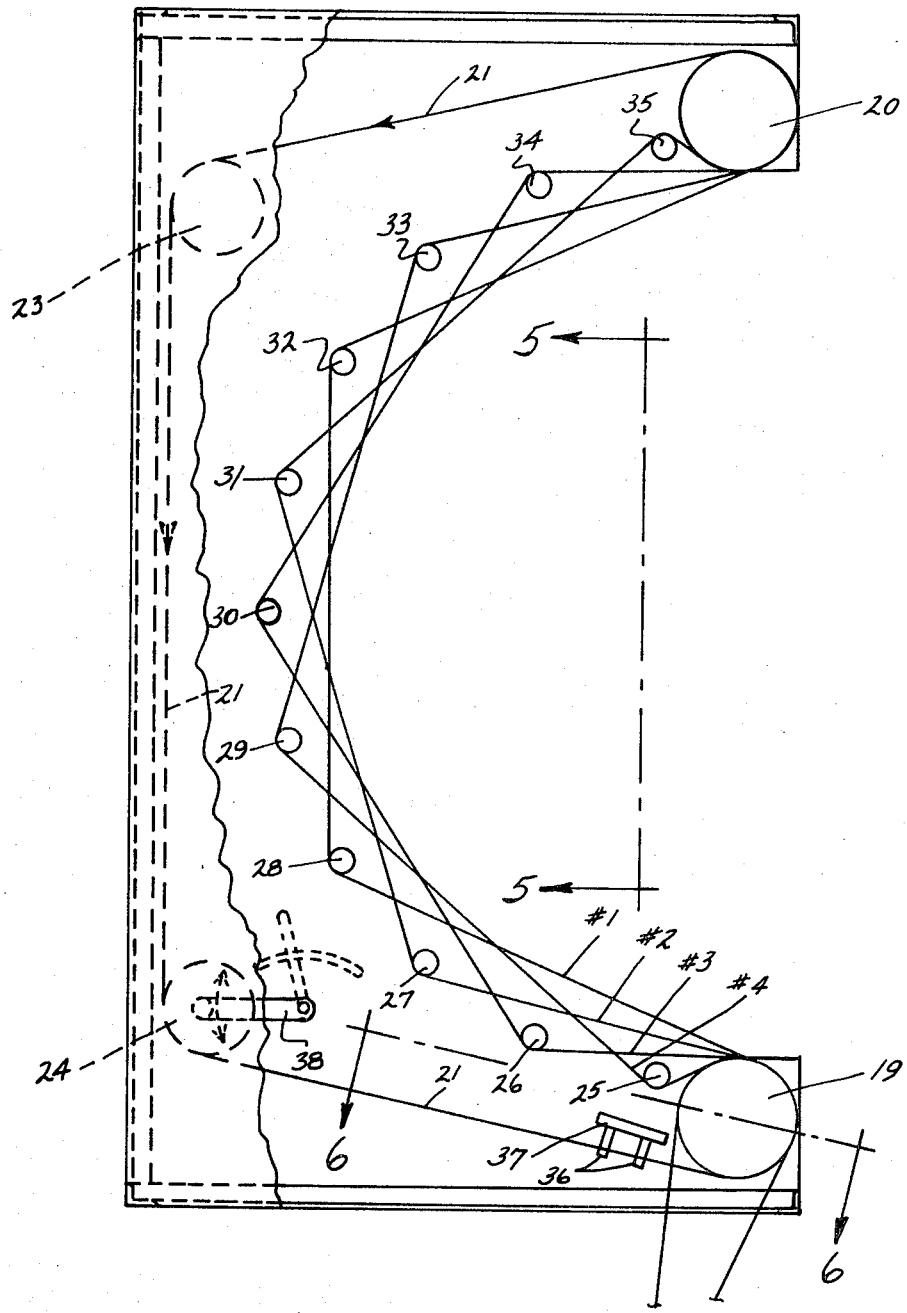
FIG. 3 is a side elevation view of the inverting apparatus of FIG. 1.
Figure 4:
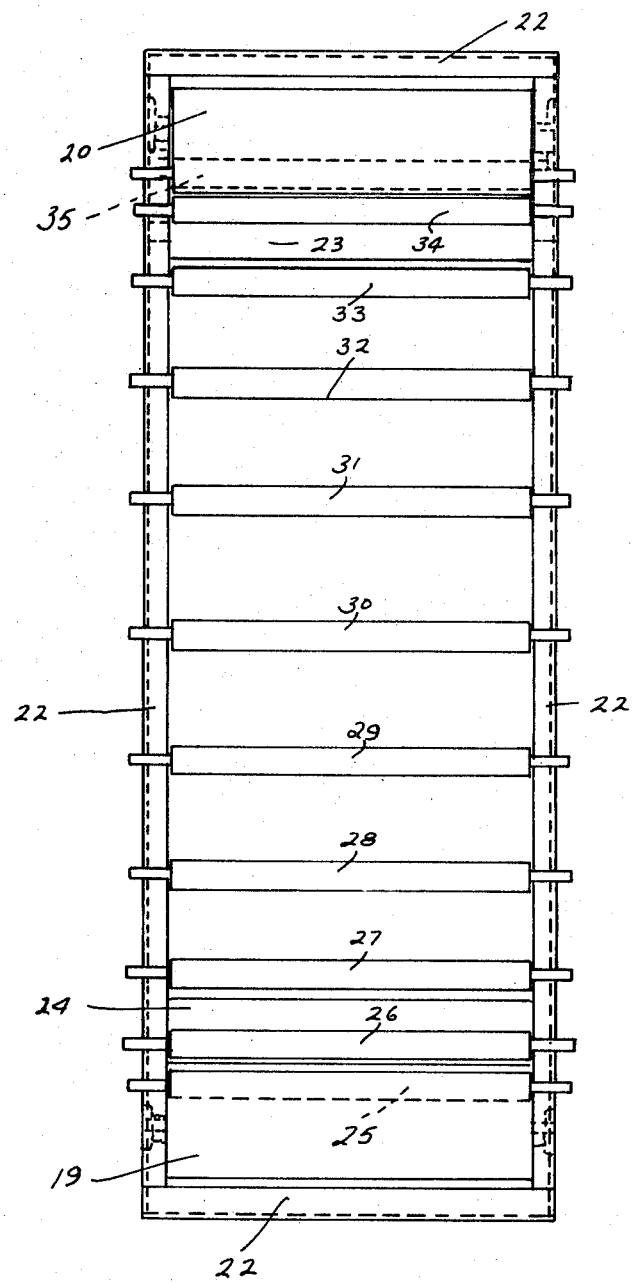
FIG. 4 is a view, looking in the direction of arrows 4—4 in FIG. 3, with the belts removed.

As shown in FIGS. 3 and 4, the inverter 10 essentially comprises a conveyor including spaced apart rollers 19 and 20 around which a plurality of endless flexible belts 21 are reeved. As described more particularly hereinafter, as belts 21 pass between rollers 19 and 20 adjacent belts pass through different individual paths which collectively approximate an arcuate path between rollers 19 and 20 and tangent thereto at the path extremities.

Rollers 19 and 20 are rotatably supported in a fixed framework 22 which also rotatably supports idler roller 23, tension adjustment roller 24, and a plurality of rollers 25–35. As shown in FIG. 3, rollers 25–35 are spaced apart and their respective axes of rotation are positioned on a circular arc the center of which is midway between rollers 19 and 20.

Guide pins 36 depend from a member 37 which is supported by framework 22, and maintain desired spacing between individual belts 21. Tension adjustment roller 24 is rotatably supported at one end of a rock member 38 which, in turn, is pivotally connected to framework 22 to provide tension adjustability for belts 21 which are reeved around rollers 19 and 20, idler roller 23, tension adjustment roller, and certain ones of rollers 25–35.

Figure 5:
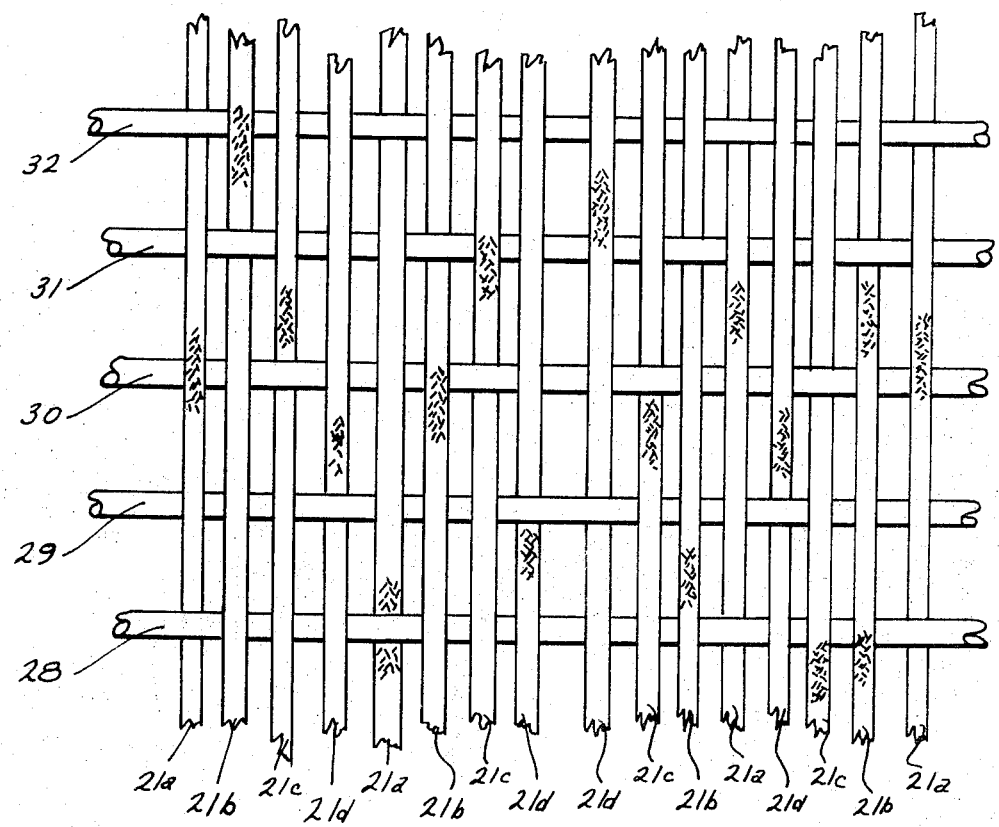
FIG. 5 is a view, looking in the direction of arrows 5—5 in FIG. 3, showing how the belts are laced around the idler rolls.
Figure 6:
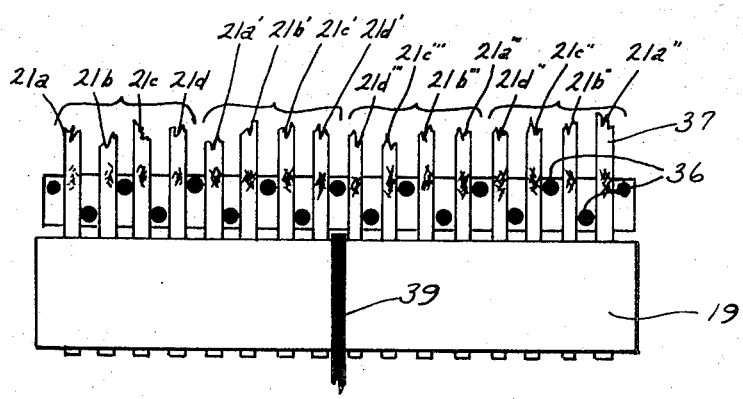
FIG. 6 is a view, looking in the direction of arrows 6—6 in FIG. 3, showing the belt guides.

The various paths of the individual belts 21 is best shown in FIGS. 3 and 5. After being reeved around roller 19, belt 21a is reeved under rollers 28 and 32 and then around roller 20, and does not contact rollers 25–27, 29–31, nor 33–35. Similarly, after leaving roller 19, belt 21b is reeved around rollers 27, 31, and 35 and does not engage rollers 25, 26, 28–30, and 32–34. Belt 21c is reeved around rollers 19, 26, 30, 34, and then around roller 20 and does not engage the other intervening rollers. Belt 21d is reeved around rollers 19, 25, 29, 33, and 20 and does not engage the other intervening rollers. This same reeving pattern is repeated with belts 21a', 21b', 21c', and 21d', and a similar reeving pattern is employed with belts 21a'', 21a''', 21b'', 21b''', 21c'', 2c''', 21d'', and 21d'''. All belts 21 are driven by roller 19 which, in turn, is driven by belt 39 and a pulley 40 connected to a motor 41.

In operation rigid or flexible blanks B are fed from a stack by blank separating and feeding means 15 onto conveyor 11 which conveys the blanks past a workstation such as coater 14 which applies a coating material to the upper sides of the blanks. After passing the workstation, the blanks move toward and are received by the inverter 10.

As a blank leaves conveyor 11 and moves over roller 19, the forward edge of the blank is frictionally engaged by one or more of the belts 21 and driven upwardly through the arcuate path defined collectively by these flexible belts as they pass through individually differing paths while moving between rollers 19 and 20. Movement along such path reverses the general direction of movement of the blanks and also inverts them so that their coated sides face downwardly and their uncoated sides face upwardly as they pass roller 20 and are received onto conveyor 13. Operating experience has shown that the action of belts unexpectedly tends to automatically straighten the blanks during their movement between rollers 19 and 20 even though they may be skewed to some degree relative to the direction of their movement along conveyor 11 at the time they are engaged by the inverter belts.

In accordance with the present invention, the blanks B are subjected to centrifugal force during the inverting process since the belts 21 drive the blanks along an arcuate path and reverse their direction of movement. Such centrifugal force acts in opposition to the effect of gravity. Accordingly, the improved inverter 10 does not require additional means to maintain driving engagement between the belts and the inverted or partially inverted blanks if the magnitude of such force is equal to or exceeds the effect of gravity. Unexpectedly, operating experience has shown that rigid blanks having a length of about 5 feet are readily inverted while they are driven along an arcuate path approximating a semi-circular arc 6 feet in diameter by an inverter embodying the present invention without any such additional engagement-maintaining means even when the speed of belts 21 was reduced and the centrifugal force magnitude was as little as about two-thirds of the effect of gravity. Such inverter will handle flexible blanks having a length greater than 5 feet if the blanks are subjected to sufficient centrifugal force to overcome the gravitational effect.

The inverted blanks are discharged from the inverter 10 onto overhead conveyor 13 which conveys the blanks to blank separating and feeding means 15. The inverted blanks are then fed onto conveyor 12 which conveys them to work station 14 where a coating is applied to the then uppermost sides of the blanks, and thereafter removes the coated blanks to storage or to another manufacturing operation.

While a particular embodiment of the invention has been illustrated and described, it will be obvious to those skilled in the art that various changes and modifications can be made without departing from the invention, and it is intended in the appended claims to cover all such changes and modifications that fall within the true spirit and scope of the invention.

What is claimed is:

1. Apparatus for inverting blanks of rigid or flexible material comprising
   first and second rotatable rolls
   a plurality of flexible endless belts reeved around said rollers, each of said belts having an exposed surface for frictionally engaging and driving said blanks when contacted thereby and when said belts are driven,
   drive means operatively connected to one of said rolls for driving said belts, and
   guide means engaging said belts and directing adjacent individual belts along individually different arcuate-like paths between said rolls.

2. Apparatus according to claim 1 wherein said guide means comprises a plurality of idler rolls.

3. Apparatus according to claim 2 wherein individual belts are reeved around certain individual idler rolls.

4. Apparatus according to claim 2 wherein the axes of said idler rolls are disposed along an arcuate path extending between said first and second rotable rolls.

5. Method of inverting and reversing direction of movement of blanks of rigid or flexible material comprising the steps of
   moving the blanks onto a conveyor having a flexible endless belt,
   driving the blanks along a semi-circular arcuate path defined by said belt by frictional engagement between said belt and the blanks, and
   maintaining said driving engagement between said belt and the blanks by subjecting the blanks to centrifugal force during their movement along said path to overcome gravitational effects and to maintain said frictional engagement, wherein said semi-circular path has a diameter exceeding the dimension of a rigid blank in the direction of its movement.

6. Method according to claim 5 wherein said path is a semi-circular arc having a diameter exceeding the dimension of a rigid blank in the direction of its movement.

7. Method according to claim 5 wherein the magnitude of said centrifugal force is at least about two-thirds of the weight of said blank.

8. Method according to claim 7 and additionally including the step of
   discharging said blank from said belt at an elevation above said rectilinear path and in a direction generally opposite to that of said initial moving step.

* * * * *